United States Patent Office 3,423,212
Patented Jan. 21, 1969

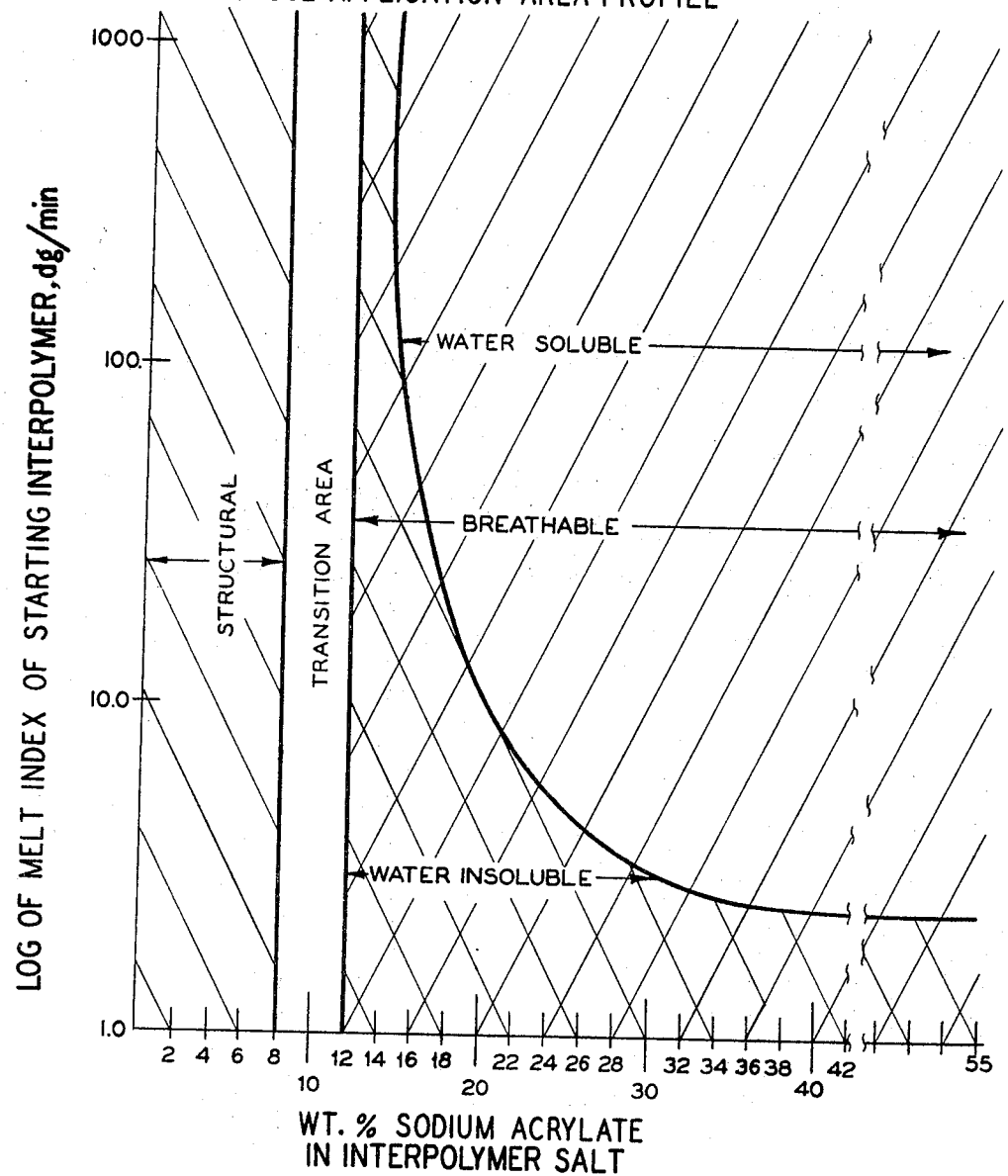

3,423,212
METHOD FOR PACKAGING FOOD PRODUCTS
Chester L. Purcell, Somerville, and Lawrence G. Imhof, Westfield, N.J., assignors to Union Carbide Corporation, a corporation of New York
Filed Nov. 20, 1964, Ser. No. 412,677
U.S. Cl. 99—171                 4 Claims
Int. Cl. B65b 25/02

ABSTRACT OF THE DISCLOSURE

Breathable films having high oxygen, carbon dioxide, and water-vapor transmission rates have been prepared from alkali metal salts of ethylene-acrylic acid interpolymers. These films are particularly useful for packaging food products, especially fresh beef where it is important to protect beef from contamination while maintaining its red appearance by providing sufficient oxygen in constant contact with the beef to keep its myoglobin in a highly oxygenated state.

---

This invention relates to alkali metal salts of ethylene-acrylic acid interpolymers and more particularly to breathable films made therefrom.

In many packaging applications where polymers are used as the packaging material, the required polymer film characteristics often include low gas and water-vapor transmission rates where protection against flavor loss by oxidation and against moisture loss or gain are specifically desired. There are other packaging applications such as fresh meat, fruit, vegetable, and other food produce wraps where the opposite film characteristics are desired, viz, high oxygen, carbon dioxide, and water-vapor transmission rates. Although the minimum acceptable transmission rates will vary with the product to be packaged the oxygen and carbon dioxide permeability of the film should be preferably at least about 100 cc./100 inches$^2$/24 hrs./mil at 23° C. and 0 percent relative humidity and the water vapor transmission rate at least about 40 g./meter$^2$/24 hours/mil.

Films having these high rates can be described as "breathable films" and are especially useful in protecting fresh beef from contamination while maintaining its attractive red appearance in display cases by providing sufficient oxygen in constant contact with the beef to maintain its myoglobin in a highly oxygenated state. These films are also useful in maintaining the fresh appearance of vegetables which wilt from exposure to trapped carbon dioxide given off by them on storage by permitting the carbon dioxide to pass through the packaging material. In addition, it is highly desirable that the polymer films also exhibit oil and grease resistance, clarity, flexibility, heat sealability, good shelf life, and strength and that the polymer films do not become fogged due to moisture condensation on the inside of the package.

It is, therefore, an object of this invention to provide polymer breathable film.

It is another object to provide film which is also clear, flexible, strong, can be heat sealed and has high strength and good resistance to oils and grease.

It is another object to provide a film which also will not become fogged due to moisture condensation on the film surface.

Other objects will become apparent to those skilled in the art upon an examination of the disclosure and examples which follow.

It has now been found that useful breathable films can be prepared from alkali metal salts of ethylene-acrylic acid interpolymers, said ethylene-acrylic acid interpolymers having a melt index of about 1 dg./min. to 1000 dg./min. and containing from about 10 to 50 percent by weight of an acrylic acid having 3 to 4 carbon atoms interpolymerized therein and with the acrylate alkali metal salt moieties comprising about 10 to 55 percent by weight of the total ethylene-acrylic acid interpolymer salt.

The term "acrylic acid" is used herein to include acrylic acid, $CH_2=CH-COOH$ as well as methacrylic acid,

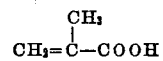

Ethylene-acrylic acid interpolymer alkali metal salts can be categorized into three classes by physical characteristics, viz, structural, breathable but water insoluble and breathable but water soluble. These characteristics are determined by a combination of several variables including melt index and composition of the parent ethylene-acrylic acid interpolymer melt index and composition of the parent ethylene-acrylic acid interpolymer melt index and composition of the interpolymer salt and percent neutralization of the parent copolymer. The ethylene-acrylic acid interpolymer salts of the present invention are found in the breathable class both water insoluble and water soluble.

FIGURE 1 delineates these boundaries for the sodium salts of this interpolymer in terms of melt index of the starting interpolymer and sodium acrylate content of the interpolymer salt. There is a definite transition zone between the structural and breathable interpolymer salts covering the area extending from about 8 percent to 12 percent sodium acrylate. The line of demarcation between breathable (water insoluble) salts and the breathable, (water soluble) salts however is not sharp. The water soluble class of salts are considered as being breathable at ambient temperatures, that is, films of the water soluble class are oxygen, carbon dioxide, and moisture permeable and remain intact unless the temperature is elevated to about 80° C. or higher where they will dissolve.

Although breathable films of the present invention can be prepared from ethylene-acrylic acid interpolymers having melt indices of about 1 dg./min. to 1000 dg./min. and containing about 10 to 50 percent by weight of an acrylic acid having 3 to 4 carbon atoms interpolymerized therein, it is preferred to employ those interpolymers in the range of about 20 dg./min. to 500 dg./min. containing about 10 percent to 30 percent acrylic acid interpolymerized therein. Furthermore, although the alkali metal salts of these interpolymers can contain from about 10 percent to 55 percent by weight of acrylic acid salt moieties, it is preferred to employ about 10 percent to 30 percent.

Ethylene-acrylic acid interpolymer alkali metal salts can be prepared with varying salt contents, depending on the end use class for which it is aimed. The neutralization of these ethylene-acrylic acid interpolymers can be effected by contacting them with free alkali metal, with alkali metal salts such as formates, acetates, nitrates, carbonates, or bicarbonates and with alkali metal bases such as hydroxides or alkoxides. Preferred alkali metal bases include lithium hydroxide, sodium hydroxide and potassium hydroxide in solution, slurry or in the melt. For convenience, it is preferred to blend the interpolymer and base on a two roll mill, in a Banbury mixer or with similar commercially available mixing equipment well known in the art. The salt content of a given interpolymer can be determined by infrared analysis of a film specimen in the 5.0 to 6.0$\mu$ region. The absence of this carbonyl absorption band indicates a stoichiometric neutralization, that is, complete conversion of the acrylic acid moieties in the ethylene-acrylic acid interpolymer to acrylic acid salts. As will be shown by the examples, complete neutralization of the acrylic acid moiety is not required in all cases to achieve the breathable films described.

The molecular weights of the ethylene-acrylic acid interpolymers are indicated in terms of melt index at 44 p.s.i. and 190° C. in units of decigrams per minute (dg./min.) in conformity with ASTM D-1238-62T.

Other ASTM test methods employed in the present invention include the following:

| Test: | ASTM No. |
|---|---|
| Secant modulus @ 1% | D-1530-58T |
| Elongation | D-882-56T |
| Tensile properties | D-882-56T |
| Water absorption | D-570-54T |
| Moisture vapor transmission | D-988-51T |
| Brittleness temperature | D-746-55T |
| Izod impact strength | D-256-64T |
| Durometer hardness ("D") | D-1484-57T |
| Gas permeability | D-1434-58 |

The oxygen transmission rates of the interpolymer salts of this invention are in the range of about 200 to 1000 cc./100 in.$^2$/24 hours /mil at about 70° F. and 1 atmosphere with limits within this range, depending upon the relative humidity, of about 200 to 300 cc./100 inches$^2$/24 hrs./mil at about 23° C., 0 percent relative humidity (RH) and one atmosphere and 900 to 1000 cc./100 inches$^2$/24 hrs./mil at 75 percent RH, 23° C.

The carbon dioxide transmission rates of the salts of this invention are in the range of about 600 to 800 cc./100 inches$^2$/24 hrs./mil at 23° C., 0 percent RH.

The water-vapor transmission rates of the interpolymer salts of this invention are at least 40 g./meter$^2$/24 hours/mil, up to 2500 g./meter$^2$/24 hrs./mil.

The breathable films of this invention can be used for packaging food products and especially cuts of beef such as steaks, ribs, roasts, liver, chopped beef and the like, fresh pork and lamb, fresh fruits such as apples, pears, and the like and fresh vegetables, especially leafy vegetables, such as lettuce, as well as corn, green beans, mushrooms and the like. Not only are these food products protected by these breathable films but the packages made therefrom are fog free, permitting a clear view of the contents by the prospective customer.

The invention is illustrated by the following examples in which all parts and percentages are by weight unless otherwise specified.

EXAMPLE 1

Ethylene-acrylic acid interpolymer salt preparation

An ethylene-acrylic acid copolymer (1180 g.) containing 18 percent acrylic copolymerized therein and having a melt index of 200 was mixed with 118 g. of solid sodium hydroxide and 5 g. of water in a Banbury mixer at 150° C. for twenty minutes. Complete neutralization of the acrylic acid moiety was achieved as shown by infrared analysis of the product.

An ethylene-acrylic acid interpolymer (100 g.) containing 18 percent acrylic acid interpolymerized therein and having a melt index of 200 dg./min. was mixed with 14 g. of solid potassium hydroxide on a two roll mill for 20 minutes at 150° C. Infrared examination of the product showed complete neutralization of the acrylic acid moiety.

In a similar manner, using lithium hydroxide, the lithium interpolymer salt was also made.

Samples of a number of interpolymer salts prepared as described above were tested for water solubility at 23° C. and also at 95-100° C. The results are given in Table I below.

TABLE I.—ETHYLENE ACRYLIC ACID INTERPOLYMERS CONVERTED TO SALTS

| Run No. | Starting Interpolymer | | Metal Salt Prepared | Water Soluble | |
|---|---|---|---|---|---|
| | Acrylic Acid (wt.) percent | Melt Index (dg./min.) | | 95-100° C. | 23° C. |
| 1 | 12 | 50 | Na | Yes | No. |
| 2 | 12 | 140 | Na | Yes | No. |
| 3 | 13 | 7 | K | No | No. |
| 4 | 13 | 50 | K | Yes | No. |
| 5 | 14 | 60 | Na | Yes | No. |
| 6 | 15 | 110 | Na | Yes | No. |
| 7 | 18 | 200 | Li, K, Na | Yes | No. |
| 8 | 22 | 200 | Na | Yes | No. |
| 9 | 27 | 16 | Li, K, Na | Yes | No. |
| 10 | 40 | 40 | K | Yes | No. |

These results illustrate that the type of ethylene-acrylic acid interpolymer salts referred to as water soluble are soluble in hot water, but not completely soluble in cold water. The hot water soluble materials remain in solution on cooling to room temperature, however.

Films of the potassium salt prepared from the ethylene-acrylic acid interpolymer (18 percent acrylic acid, 200 dg./min. melt index) were prepared by molding, casting from water at 100° C. and casting from water at 23° C. and various physical properties of these films were compared with each other and with a molded film of the parent ethylene-acrylic acid interpolymer. The data obtained are presented in Table II.

TABLE II.—PHYSICAL PROPERTIES OF ETHYLENE-ACRYLIC ACID INTERPOLYMERS AND POTASSIUM SALT

| | | | | |
|---|---|---|---|---|
| Chemical form | Acid | Salt | Salt | Salt. |
| Film preparation | Molded | Molded | Sol. cast (100° C.) | Sol. cast (23° C.) |
| Secant Modulus,[1] p.s.i | 6,330 | 9,900 | 10,970 | 23,320. |
| Tensile Strength,[2] p.s.i | 2,335 | 1,690 | 1,970 | 1,282. |
| Elongation, percent | 437 | 363 | 179 | 8. |
| Solubility: | | | | |
| Cold H$_2$O (23° C.) | Insol | Insol | Insol | Disintegrates. |
| Hot H$_2$O (100° C.) | Insol | Sol | Sol | Sol. |

[1] Instron tensile tester, 10%/min. strain rate.
[2] Instron tensile tester, 100%/min. strain rate.

Table III contains like data obtained with an ethylene-acrylic acid interpolymer (27% acrylic acid, 16 dg./min. melt index) and its potassium salt.

TABLE III.—PHYSICAL PROPERTIES OF ETHYLENE-ACRYLIC ACID INTERPOLYMER AND POTASSIUM SALT

| | | | | |
|---|---|---|---|---|
| Chemical form | Acid | Salt | Salt | Salt. |
| Film preparation | Molded | Molded | Sol. cast (110° C.) | Sol. cast (23° C.) |
| Secant Modulus,[1] p.s.i | 7,270 | 13,120 | 6,310 | 16,780. |
| Tensile Strength,[2] p.s.i | 4,330 | 2,190 | 1,728 | 1,020. |
| Elongation, percent | 458 | 318 | 241 | 18. |
| Solubility: | | | | |
| Cold H$_2$O (23° C.) | Insol | Insol | Insol | Disintegrates. |
| Hot H$_2$O (100° C.) | Insol | Sol | Sol | Sol. |

[1] Instron tensile tester, 10%/min. strain rate.
[2] Instron tensile tester, 100%/min. strain rate.

These data illustrate that films made from water soluble ethylene-acrylic acid interpolymer salts are tough and are insoluble in water at room temperature.

The high moisture vapor transmission of the breathable films of this invention are demonstrated and the lower limits of the alkali metal acrylic acid salt content defined in the following example.

EXAMPLE 2

A series of interpolymer salts were prepared at various degrees of acid neutralization using the procedure described in Example 1 starting with an ethylene-acrylic acid interpolymer as the base resin. The moisture vapor transmission of these interpolymers was measured and compared with a Control ethylene-acrylic acid interpolymer. These data presented in Table IV show the improvement in moisture vapor transmission over the Control.

TABLE IV

| Run No. | Base Resin | | Alkali Metal Acrylate, wt. percent | Moisture Vapor Transmission [2] |
|---|---|---|---|---|
| | M.I. | %/AA [1] | | |
| 1 | 490 | 23 | [3] 25.0 | [4] 2,250 |
| 2 | 200 | 18 | [5] 15.1 | 918 |
| 3 | 145 | 18 | [5] 13.2 | 860 |
| 4 | 145 | 18 | [5] 11.3 | 55 |
| 5 | 145 | 18 | [5] 12.5 | 77 |
| 6 | 50 | 13 | [5] 9.4 | 30 |
| 7 | 50 | 13 | [5] 15.1 | 1,280 |
| 8 | 50 | 13 | [5] 12.5 | 180 |
| 9 | 50 | 13 | [5] 16.2 | 1,150 |
| 10 | 50 | 14 | [5] 10.6 | 40 |
| 11 | 50 | 13 | [3] 18.1 | 720 |
| 12 | 50 | 13 | [6] 13.5 | ------ |
| 13 | 28 | 12.5 | [5] 15.1 | 920 |
| 14 | 16 | 27 | [3] 36.1 | 1,500 |
| 15 | 10 | 10.5 | [5] 12.5 | 62 |
| 16 | 10 | 13 | [5] 16.2 | 1,310 |
| Control | 10 | 13 | 0 | 11 |

[1] Acrylic acid content.
[2] g./Meter²/24 hrs. at 95% RH, 100° F.; 5-8 mil plaques.
[3] Potassium acrylate.
[4] g./Meter²/24 hrs. at 95% RH, 100° F.; 1.5 mil film.
[5] Sodium acrylate.
[6] Lithium acrylate.

EXAMPLE 3

Physical properties of various ethylene-acrylic acid interpolymer sodium salts The combined effects of melt index of both the parent ethylene-acrylic acid interpolymer and sodium salt, sodium acrylate content of the interpolymer and percent conversion by neutralization with sodium hydroxide to the copolymer salt on physical properties are demonstrated in Table V. For purposes of comparison the secant modulus, tensile strength, percent elongation, water adsorption and moisture vapor transmission of high density polyethylene and low density polyethylene are also given in Table V.

These data, combined with the data shown in Tables I, II, III, and IV serve to illustrate the type of categories these materials fall under, as defined by the figure. Even though some of these materials containing moderately high contents of salt moiety absorb water and have high moisture vapor transmission rates, molded films are clear and tough enough to be suitable for a variety of packaging applications. Even those compositions which are hot water soluble but cold water insoluble are suitable for use as breathable packaging films. While the figure is a plot of the logarithm of the melt index of the base ethylene-acrylic acid interpolymer as the ordinate against the weight percent sodium acrylate moiety in the interpolymer salt, plots in which the percent potassium or lithium acrylates constitute the abscissa are generally the same except for differences due to differences in molecular weight of the respective salt moieties. Thus, as shown in the figure for sodium acrylate moieties, the range for breathable films (both water soluble and insoluble) is about 12% to 55% by weight of the total interpolymer salt. With potassium acrylate moieties this range is about 14% to 60% by weight of the total interpolymer salt. And with lithium acrylate moieties this range is about 11% to 54% by weight of the total interpolymer salt.

EXAMPLE 4

An ethylene-acrylic acid interpolymer containing 18% acrylic acid and having a melt index of 200 dg./min. at 190° C. was partially converted to the sodium salt by milling as described in Example 1. The converted salt contained 15.5 weight percent sodium acrylate.

TABLE V.—PROPERTIES OF INTERPOLYMER SODIUM SALTS

| Run No. | Starting Polymer | | Percent Converted To Sodium Salt | Composition | | | | M.I. (dg./min.) | Secant Mod. at 1% Elongation, p.s.i. | Tensile Strength, p.s.i. | Elongation, Percent | Water Absorption [1] | | Moisture Vapor Transmission [2] (g./meter²/ 24 hrs.) |
|---|---|---|---|---|---|---|---|---|---|---|---|---|---|---|
| | Percent AA | M.I. | | Percent Ethylene | Percent Acrylic Acid | Percent Sodium acrylate | | | | | | Wt. Percent Pick Up | Material Loss Wt. Percent | |
| 1 [3] | 2.7 | 1.0 | 0 | 97.3 | 2.7 | 0 | .98 | 18,570 | 2,201 | 425 | .14 | ------ | 5.5 |
| 2 [3] | 2.7 | 1.0 | 75 | 96.7 | .7 | 2.6 | 0.18 | 18,769 | 2,299 | 380 | .40 | ------ | 7.2 |
| 3 [3] | 2.7 | 1.0 | 100 | 96.5 | 0 | 3.5 | 0.005 | 18,292 | 2,821 | 365 | .58 | ------ | 7.4 |
| 4 | 9.0 | 47 | 0 | 91 | 9 | 0 | 46 | 12,380 | 2,276 | 460 | .37 | ------ | 4.7 |
| 5 | 9.0 | 47 | 75 | 89 | 2.24 | 8.7 | 0.96 | 23,169 | 4,367 | 425 | 1.8 | ------ | 12.0 |
| 6 | 9.0 | 47 | 100 | 88.5 | 0 | 11.5 | 1.7 | 18,231 | 5,054 | 370 | 14.8 | ------ | 99.2 |
| 7 | 13 | 7 | 0 | 87 | 13 | 0 | 6.7 | 11,300 | 4,061 | 470 | .26 | -.07 | 11 |
| 8 | 13 | 7 | 25 | 86.1 | 9.7 | 4.2 | 1.7 | 41,200 | 2,957 | 370 | .56 | -.06 | 14 |
| 9 | 13 | 7 | 50 | 85.1 | 6.5 | 8.4 | 1.7 | 55,200 | 6,217 | 380 | 1.05 | -.08 | 10 |
| 10 | 13 | 7 | 75 | 84.6 | 3.1 | 12.3 | 0.09 | 41,800 | 6,857 | 340 | 14.15 | -3.4 | 38 |
| 11 | 13 | 7 | 100 | 83.1 | 0 | 16.3 | 0.05 | 40,600 | 7,180 | 335 | 15.1 | -2.3 | 386 |
| 12 | 18 | 200 | 0 | 82 | 18 | 0 | 200 | 6,330 | 2,335 | 437 | 1.3 | ------ | 58 |
| 13 | 18 | 200 | 75 | 78.9 | 4.3 | 16.8 | 0.7 | 43,700 | 4,445 | 175 | 49.7 | -9.2 | 400 |
| 14 | 18 | 200 | 100 | 77.8 | 0 | 22.2 | 0.05 | 35,496 | 4,480 | 237 | 25.2 | ------ | 400 |
| 15 | High density polyethylene (0.94) | | | | | | 4.7 | 150,000 | 4,600 | 15 | .03 | ------ | 0.2 |
| 16 | Low density polyethylene (0.92) | | | | | | 1.5 | 23,000 | 1,800 | 600 | .01 | ------ | 7.5 |

[1] Immersed 7 days in H₂O at 23° C.  [2] All measurements on 5-8 mil film, unless otherwise stated, at 95% relative humidity, 100° F.  [3] Control.

In this example, the effect on oxygen permeability of increasing the percent relative humidity (RH) is noted. For these ethylene interpolymer salt, as the percent relative humidity is increased, the oxygen permeability increases, as shown in Table VI.

index and composition on the physical characteristics which determine their end-use class. These data are presented in Table VII.

TABLE VII.—INTERPOLYMER SODIUM SALTS

| Run No. | Application Area | Composition (wt. percent) of Salt[1] | | | Melt Index, dg./min. | Composition Starting Polymer (wt. Percent[1]) | | Melt Index, dg./min. |
|---|---|---|---|---|---|---|---|---|
| | | $C_2$ | AA | SA | | $C_2$ | AA | |
| 1 | Structural | 84.7 | 9.8 | 5.5 | 0.3 | 85-87 | 13-15 | 5 |
| | | 84.5 | 9.1 | 6.4 | 1.6 | 85-89 | 13-15 | 50 |
| 2 | Breathable (water insoluble) | 82.3 | 6.0 | 11.7 | 0.2 | 85-87 | 13-15 | 50 |
| 3 | Breathable (water soluble) | 78.9 | 4.3 | 16.80 | 0.7 | 82 | 18 | 140 |
| | | 78.4 | 1.6 | 20 | | 82 | 18 | 140 |

[1] $C_2$=Ethylene; AA=Acrylic acid; SA=Sodium acrylate.

TABLE VI

| Oxygen, percent relative humidity | Permeability [1] |
|---|---|
| Dry | 192 |
| 10% RH | 260 |
| 20% | 617 |
| 43% | 634 |
| 75% | 906 |

[1] Cc./100 in.$^2$/24 hrs./mil/atm.

The oxygen permeability test cell consists of a sample holder separating a large cavity from a much smaller one with gauges (Bourdon) for reading the pressures in each cavity. Before the test, a reservoir of a salt solution generating a known water vapor pressure (relative humidity) at room temperature is connected to each of the two cavities and to the surfaces of the test film. The test film is allowed to equilibrate at this relative humidity.

Next, the smaller cavity is isolated (with the pressure in this cavity being equal to the vapor pressure of water from the salt solution). Then the larger cavity is pressured with the test gas to a known pressure—usually one atmosphere or less. Finally, the rate of pressure buildup in the smaller cavity, as gas permeates through the test film (which maintains a constant water content) is measured. The gas permeability at this constant relative humidity is calculated from the rate of pressure buildup, the cell dimensions, the sample dimensions, and the known gas pressure driving force.

EXAMPLE 5

Compositions representative of structural, breathable and water soluble interpolymer salts Several ethylene-acrylic acid interpolymer salts were prepared showing the effect of such variables as melt

EXAMPLE 6

Effect of water on ethylene-sodium acrylate interpolymer

The physical properties of an ethylene-sodium acrylate interpolymer (77.8:22.2) were studied after conditioning samples at two relative humidity conditions, viz, 50% RH and 90% RH, at 23° C. and 35° C. for 24 hours and 7 days. The effects of immersion in water at 24° C. for 24 hours and 7 days were also recorded. The results are contained in Table VIII, and demonstrate that the material has useful strength properties, even when water saturated.

This interpolymer before conditioning had an Izod impact strength of 5.8 ft. lbs./in., excellent resistance to SAE 20, paraffin base lubricating oil, as demonstrated by negligible pick up after 7 days immersion in this oil at 23° C. and 50° C., excellent grease resistance (over 10 days with no failures in contact with a grease dissolved in turpentine) and a brittleness temperature of −15° C. to −20° C.

TABLE VIII.—EFFECT OF WATER ON PROPERTIES OF INTERPOLYMER SODIUM SALTS INTERPOLYMER COMPOSITION: 76.6/23.4 ETHYLENE-SODIUM ACRYLATE

| Experiment No. | Secant Modulus, p.s.i. | Ultimate Tensile Strength, p.s.i. | Percent Elongation | Conditioning |
|---|---|---|---|---|
| 6-1 | 35,805 | 3,840 | 193 | 23° C., 50% RH, 24 hrs. |
| 6-2 | 42,968 | 3,926 | 210 | 23° C., 50% RH, 7 days. |
| 6-3 | 11,496 | 1,445 | 325 | 35° C., 90% RH, 24 hrs. |
| 6-4 | 8,576 | 1,421 | 385 | 35° C., 90% RH, 7 days. |
| 6-5 | 3,101 | 608 | 105 | Immersed H$_2$O, 23° C., 24 hrs. |
| 6-6 | 3,499 | 583 | 100 | Immersed H$_2$O, 23° C., 7 days. |

EXAMPLES 7-9

Films of an interpolymer salt containing 17.5% sodium acrylate, 4.5% acrylic acid and 78% ethylene and having a melt index of 0.2 dg./min. prepared as in Example 1 from an ethylene-acrylic acid interpolymer containing 18% acrylic acid and having a melt index of 200 dg./min. These films exhibited useful oxygen and carbon dioxide transmission rates in both the dry and wet state. Practical demonstrations of this property were effected by packaging freshly cut beef in these films with heat sealing at 250° F. and storing the packaged beef at 5° C. The original red color was still observable through the packaging film after 96 hours, thus indicating that the myoglobin of the beef was maintained in a state similar to that in the freshly cut condition. The film did not shown any fogging from moisture condensation and the contents of the package were clearly visible through the film.

Similar storage stability can be achieved with fresh vegetables especially leafy vegetables, such as lettuce, as well as corn, green beans, mushrooms and the like, and fresh fruits such as apples, pears and the like packaged with the films of this invention.

EXAMPLE 10

To demonstrate especially the non-fogging characteristics of breathable films described herein, 1.5 mil thick films extruded from the materials described in Runs 2 and 3 of Table VII were suspended over beakers containing water at 70 to 80° C. A similar film of low density polyethylene was likewise suspended over a beaker of 70 to 80° C. water. When the water vapor from the beaker contacted the surface of the polyethylene film, the film immediately became fogged with condensed water and it was impossible to see through the film. However, when the water vapor contacted the films of the interpolymer salts, the films did not become fogged from the condensed water and it was possible to see through the film. Even after 2 hours of exposure to the water vapor, the polyethylene film remained fogged but the interpolymer salt films were clear and not fogged with condensed water.

These results demonstrate that the high moisture vapor transmission rates of the interpolymer salts permit diffusion of water vapor through the film, thereby preventing the film from becoming fogged with condensed water. This type of non-fogging behavior is highly desirable in packaging applications where the package contents must be visible for an appealing appearance.

EXAMPLE 11

Films similar to those described in Examples 7–9 prepared from ethylene-methacrylic acid interpolymer alkali metal salts exhibit essentially equivalent packaging properties as those described in Examples 7–9.

Although the invention has been described in its preferred forms with a certain degree of particularity, it is understood that the present disclosure has been made only by way of example, and that numerous changes may be resorted to without departing from the spirit and scope of the inventions.

What is claimed is:

1. A method for packaging food products comprising enclosing said food products in a breathable film, having high oxygen, carbon dioxide, and water-vapor transmission rates, of completely neutralized alkali metal salts of ethylene-acrylic acid interpolymers said ethylene-acrylic acid interpolymers having a melt index of about 1 dg./min. to 1000 dg./min. and containing from about 10 to 50% by weight of acrylic acid having 3 to 4 carbon atoms interpolymerized therein, wherein the carbon dioxide transmission rate is in the range of about 600 to 800 cc./100 inches$^2$/24 hrs./mil at 73.4° F., the oxygen transmission rate lies in a range of about 200 to 1000 cc./100 in.$^2$/24 hours/mil at about 70° F. and one atmosphere and the water-vapor transmission rate is at least 40 g./meter$^2$/24 hours.

2. The method claimed in claim 1 wherein the alkali metal is sodium.

3. The method claimed in claim 1 wherein the alkali metal is potassium.

4. The method claimed in claim 1 wherein the alkali metal is lithium.

References Cited

UNITED STATES PATENTS

| | | | |
|---|---|---|---|
| 3,022,543 | 2/1962 | Baird et al. | 99—174 X |
| 3,099,350 | 7/1963 | Hammond | 99—174 X |
| 3,245,198 | 4/1966 | Schmied | 99—174 X |
| 3,264,272 | 8/1966 | Rees | 260—80.5 X |

HYMAN LORD, *Primary Examiner.*

U.S. Cl. X.R.

99—174